United States Patent [19]

Sand

[11] Patent Number: 4,791,640

[45] Date of Patent: Dec. 13, 1988

[54] CALL CHARGING ARRANGEMENT

[75] Inventor: William C. Sand, St. Charles, Ill.

[73] Assignee: American Telephone and Telegraph Company, AT&T Bell Laboratories, Murray Hill, N.J.

[21] Appl. No.: 789,469

[22] Filed: Oct. 21, 1985

[51] Int. Cl.⁴ ............................................. H04Q 11/04
[52] U.S. Cl. ..................................... 370/58; 379/114; 379/144
[58] Field of Search ..................... 370/58; 179/6.3 LC, 179/7.1 R, 7.1 TP; 340/825.31, 825.33, 825.34; 379/114, 115, 144, 186, 187

[56] References Cited

U.S. PATENT DOCUMENTS

| | | | |
|---|---|---|---|
| 3,931,476 | 1/1976 | Matthews | 379/114 |
| 4,326,123 | 4/1982 | Hosterman | 179/6.3 CC |
| 4,517,412 | 5/1985 | Newkirk et al. | 179/6.3 CC |
| 4,518,824 | 5/1985 | Mowdardini | 179/6.3 CC |
| 4,595,983 | 6/1986 | Gehalo et al. | 179/6.3 CC |

OTHER PUBLICATIONS

R. J. Jaeger, Jr. et al., "TSPS No. 1: System Organization and Objectives", The Bell System Technical Journal, vol. 49, No. 10, Dec. 1970, pp. 2420-2423, 2428-2429.
R. J. Jeager, Jr. et al., "TSPS No. 1: System Organization and Objectives", The Bell System Technical Journal, vol. 49, No. 10, Dec. 1970, pp. 2417-2429.
R. E. Saehler et al., "Traffic Service Position System No. 1 Recent Developments: An Overview", The Bell System Technical Journal, vol. 58, No. 6, Part 1 of 2, Jul.-Aug. 1979, pp. 1109-1118.

Primary Examiner—Douglas W. Olms
Assistant Examiner—Frank M. Scutch, III
Attorney, Agent, or Firm—Richard J. Godlewski

[57] ABSTRACT

An arrangement is disclosed for charging a credit card number for a call extended from a calling customer line to a called destination via a toll telecommunications network. Calls including supervisory and traffic information from a plurality of calling lines are multiplexed for extending the calls over a time division multiplex communications channel through the call charging arrangement to the network. The arrangement includes a time slot separator for separating the supervisory information from the call information and a switching network for switching the remaining call information to a traffic information receiver. A central processor in the arrangement receives the credit card number from the traffic information receiver and forwards the number to a data base for call charging authorization. When authorized, the processor utilizes the supervisory information to make a record charging the credit card number for the call. In addition, a transmitter in the arrangement forwards the supervisory information to the toll network. The switching network also switches the call information which is combined with the supervisory information to the toll network. Periodically, the call records are sent to a billing system for processing.

24 Claims, 3 Drawing Sheets

CALL CHARGING ARRANGEMENT

TECHNICAL FIELD

This invention relates generally to telecommunications systems and particularly to an arrangement for charging calls to a customer-entered identification number.

BACKGROUND OF THE INVENTION

There are a number of operator systems for charging telephone calls to various billing numbers such as the directory number of a calling or called line or a calling card number provided by a telephone operating company. One such operator system is the Traffic Service Position System No. 1 described in *The Bell System Technical Journal*, Vol. 49, No. 10, December, 1970, and Vol. 58, No. 6, Part 1 of 2, July-August, 1979. This system serves a large number of customer lines through a local telephone exchange by connections to a number of analog trunks between the local office exchange and a toll or transit office exchange to receive and send analog signals to customer lines served by the local exchange. Another operator system is the Operator Services Position System which is a feature of AT&T's 5 ESS TM digital switch.

There are also a number of existing credit card reader systems to receive charging information from special credit card reader stations. However, these systems typically require three paths through a local telephone office exchange. Two of these paths are used to establish a connection from the reader station through the office to an intraoffice trunk back through the office to a processor of the system. The third path is from the processor through the office to an interoffice trunk to a toll office that routes the call to the called destination. The processor collects and verifies the credit card number from the reader station, forwards the call to the called destination, and charges the credit card number for the call.

With the advent of interconnect common carriers providing coin phone and credit or calling card phone service at public facilities such as airports, the interconnect carriers want connections to these phones without having to go through a local office exchange and paying access charges. The interconnect carriers also want to provide these services without going through a costly operator system.

SUMMARY OF THE INVENTION

The foregoing problems are solved and a technical advance is achieved by a novel arrangement for charging a customer-entered identification number, such as a credit card number, for a call. This arrangement is illustratively integrated with a communication channel for extending a call including supervisory and traffic information from a calling line to a telecommunications network without going through a local telephone office exchange. The arrangement includes means for separating the supervisory information from the call. Also included is a receiver for receiving traffic information including the customer-entered identifiation number and a switch for switching the call from the communications channel to the traffic information receiver. A processor included in the arrangement makes a record charging the customer-entered identification number received from the traffic information receiver for the call in response to the supervisory information from the separator.

In the illustrative embodiment of the invention, the arrangement receives a call from a calling line in a predetermined time slot of a time division multiplex (TDM) signal. A time division multiplex terminal multiplexes calls from a plurality of calling lines into the TDM signal and advantageously sends the signal to a toll telecommunications network via a communications line through the arrangement to a toll telecommunications network without passing through a local telephone office exchange. The arrangement includes a time slot separator for separating and sending the supervisory information from the call to a central processor via a supervisory information receiver. The arrangement also includes a switching network for switching the call to a traffic information receiver that forwards the credit card number included in the traffic information to the central processor. The central processor sends the credit card number to a data base for authorization to charge the credit card number for the call. When authorized, the processor causes the switching network to switch the call to the telecommunications network and makes a record charging the credit card number for the call using well-known origination, answer, and disconnect supervisory information. Periodically, the central processor sends the call records to a system for billing the credit card charged calls.

A transmitter included in the arrangements sends dial tone to the calling line in response to the receipt of origination supervisory information from the communication line. After receiving traffic information including the called destination, the processor causes the transmitter to send a prompt to the calling line to enter, for example, the credit card number to which the call is to be charged. The generation of these two signals is accomplished by a signal processor under the control of two different sets of program instructions stored in a memory of the transmitter.

The traffic information receiver includes a signal processor under the control of two sets of program instructions stored in memory to receive traffic information such as called destination and credit card information sent with either multifrequency or dual-tone multifrequency signals.

A supervisory signal receiver and a transmitter are also included in the arrangement to receive and send supervisory information during various stages of the call in either direction between the TDM terminal and network.

The switching network includes two time slot interchangers for switching the time slots of a digital signal either from a traffic information transmitter or the communications channel to the time slots of an outgoing digital signal or to traffic information receivers. This establishes two unidirectional paths between the telecommunications network and TDM terminal.

Communication facilities are also provided for sending the customer-entered identification number to a data base and receiving authorization to charge the customer-entered number for the call. Similarly, communication facilities are provided from the processor to send periodically the charged call records to a system for billing.

BRIEF DESCRIPTION OF THE DRAWING

The invention is more fully understood from the following detailed description when read with reference to the drawing in which.

DETAILED DESCRIPTION

Figure 1:
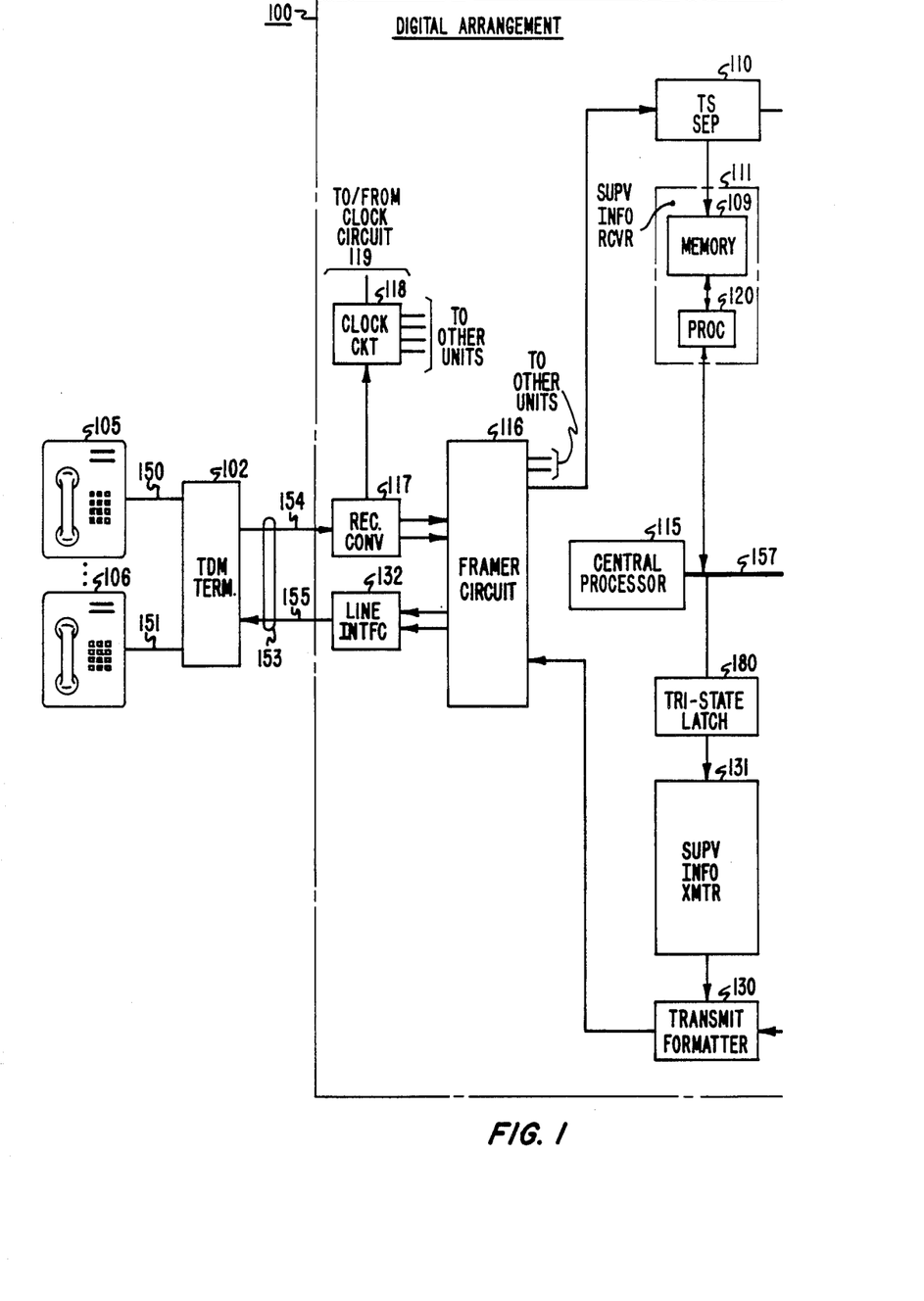
FIGS 1-3 depict portions of a block diagram of an illustrative embodiment of the call charging arrangement.
Figure 2:
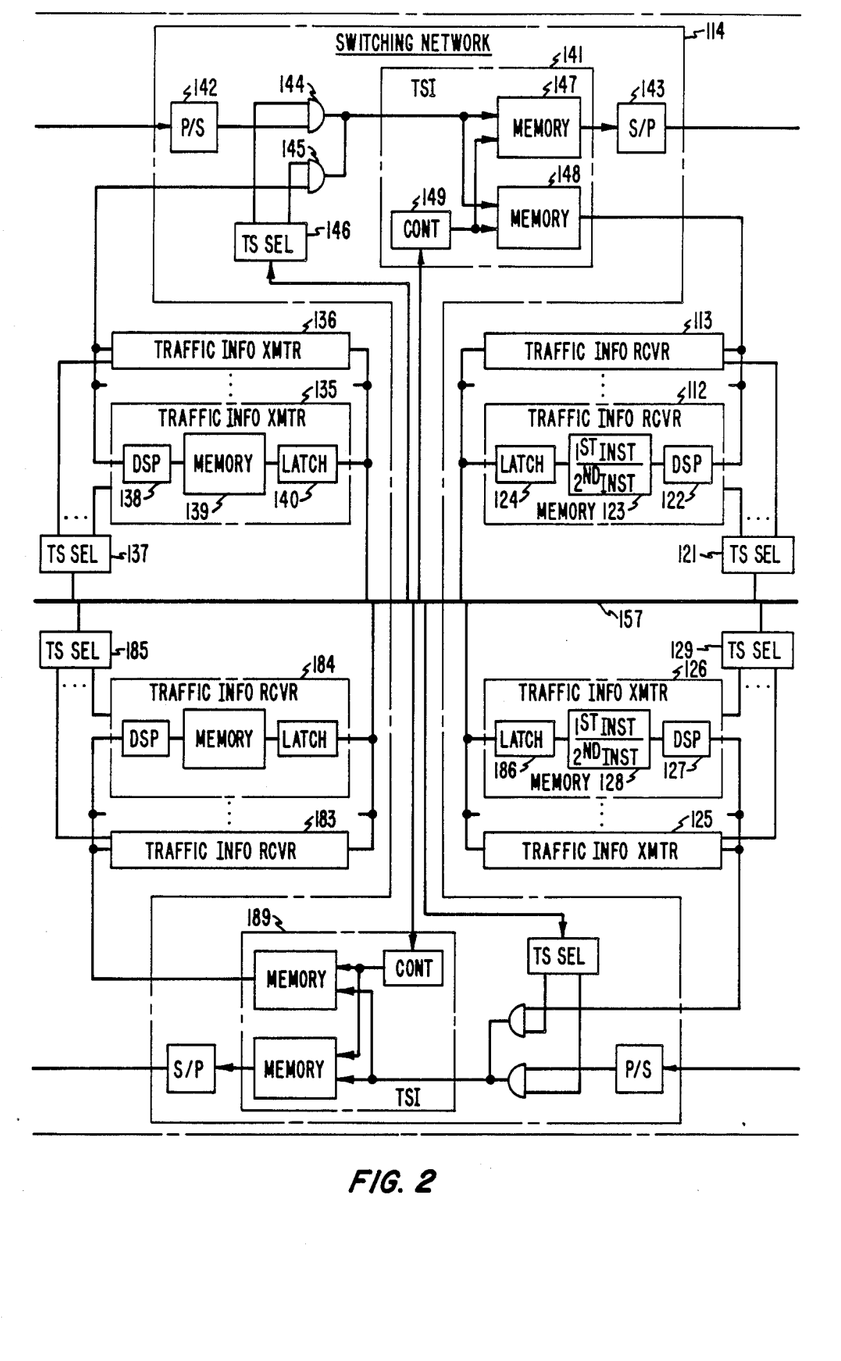
Figures 3, 4:
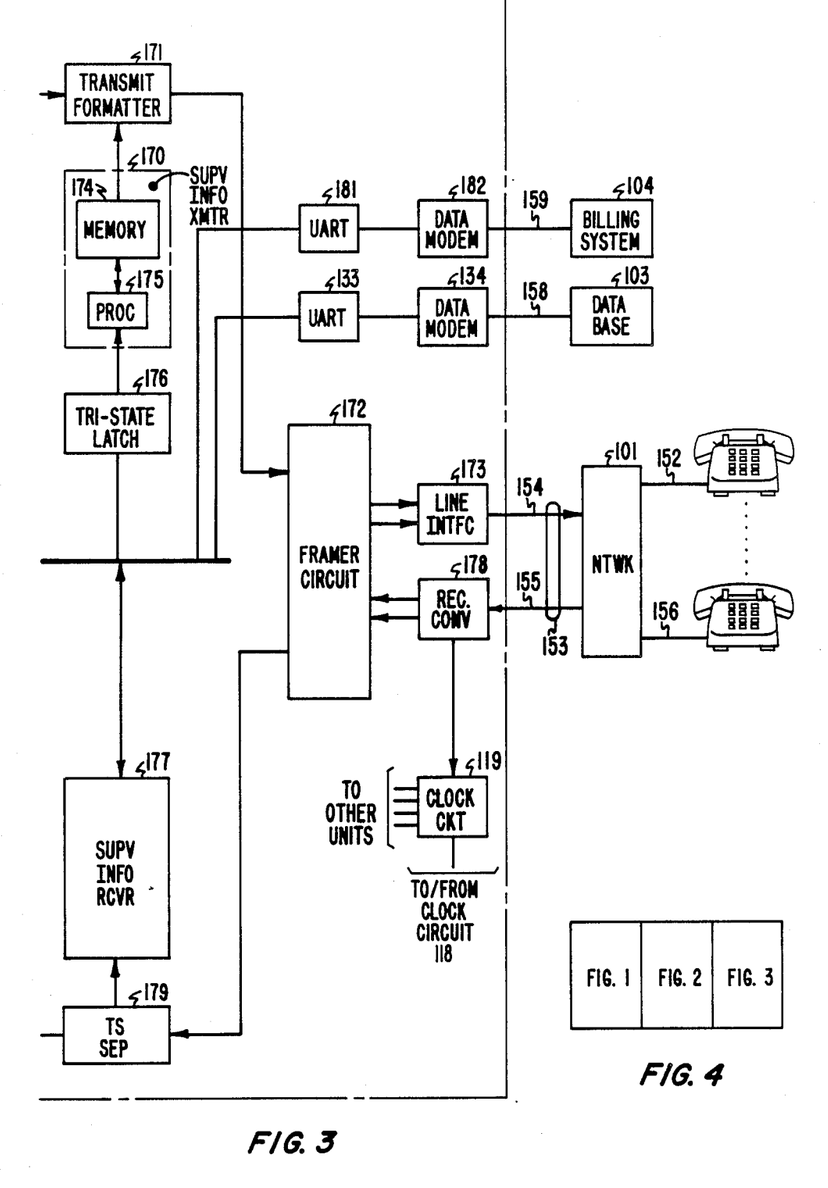
FIG. 4 shows the interrelationship of FIGS. 1-3 to form a complete block diagram of the illustrative arrangement.

FIGS. 1-3 depict an illustrative embodiment of a digital arrangement 100 for charging a customer-entered identification number, such as a credit or calling card number, for a call from a calling line 150 to a called destination such as called line 152 via a digital communications line 153 and a telecommunications network 101. Digital line 153 forms a channel to communicate well-known pulse code modulated (PCM) time division multiplexed digital signals in two directions between time division multiplex terminal 102 and network 101 on unidirectional transmission paths 154 and 155. Each digital signal has a plurality of time slots in which a call, for example, from calling customer line 150 to called line 152 is included in one of the time slots. Calls from a plurality of customer lines such as 150 and 151 are multiplexed by terminal 102 and communicated over digital line 153 to network 101 for demultiplexing and connection to plurality of called destinations such as customer lines 152 and 156. Connected serially in digital line 153, digital arrangement 100 verifies the customer-entered identification number for each call with a data base 103 and makes a record charging the authorized identification number for the call. Periodically, the arrangement sends the call records to a billing system 104 that bills the customers for their calls.

In addition, digital arrangement 100 performs a number of time slot switching functions. For example, the arrangement can switch a call in a predetermined time slot of the digital signal from the multiplex terminal to the arrangement to a desinated time slot of another digital signal from the arrangement to the network. Similarly in the opposite direction, the arrangement switches the same call in a particular time slot of the digital signal from the network to the arrangement to a certain time slot for still another digital signal from the arrangement to the multiplex terminal. Furthermore, the arrangement can switch the call in any of the aforementioned time slots to any one of a number of receivers and transmitters to process and exchange supervisory and traffic information with the multiplex terminal, network, and calling and called lines.

As suggested, calls from customer lines 150 and 151 include well-known traffic and supervisory information which is used to route a call and charge the customerentered identification number for the call. Credit card reader stations such as 105 and 106 which terminate respective customer lines 150 and 151. The traffic information includes, among other things, the directory number of the called destination such as called line 152. The traffic information also includes the customer-entered identification number such as the credit or calling card number entered by the customer at a credit card reader station. The supervisory information associated with the call includes, among other things, the well-known "onhook" and "off-hook" conditions of a customer line which are used to indicate the supervisory state of a call on the line. These states include well-known origination, answer, and disconnect line supervisory states which are used to make the record charging the customer for the call. The traffic and supervisory information for each call is multiplexed by time division multiplex terminal 102 and communicated to digital arrangement 100 via unidirectional transmission path 154. This information is communicated to digital arrangement 100 in a well-known bipolar PCM digital format.

Time division multiplex terminal 102 is a digital channel bank such as the D4 digital channel bank which is disclosed in the *The Bell System Technical Journal*, Volume 61, No. 9, Part 3, November, 1982, which may be referred to for a more comprehensive understanding of the construction and operation of the digital channel bank. This digital channel bank is suitable for use with any well-known T-1 digital communication channel such as communication line 153.

Digital arrangement 100 comprises time slot separator 110, supervisory information receiver 111, a plurality of traffic information receivers such as 112 and 113, and a switching network 114 all under the control of central processor 115 for receiving the traffic and supervisory information associated with a call from a calling line such as customer line 150. These and any other units or circuits in digital arrangement 100 are all well known and commercially available. Time slot separator 110 separates the supervisory information associated with a call in a predetermined time slot and sends the supervisory information to supervisory information receiver 111 and forwards the remaining information of the call in the predetermined time slot to switching network 114. The separator also sends to the other units of the arrangement well-known timing signals that indicated the start of a time slot containing supervisory information. Time slot separator 110, such as the WE TM 257P receiver synchronizer, receives the incoming PCM digital signal from a framer circuit 116, such as the WE 229CG framer, and a receive converter 117, such as the WE 630AG receive converter. Receive converter 117 converts the serial bipolar PCM digital signal from terminal 102 and unidirectional communication line path 154 to positive and negative unipolar PCM signals for framer circuit 116. In addition, receive converter 117 sends a well-known recovered clock signal from the incoming PCM signal to clock circuit 118 which is a crystal-controlled phase-locked loop clock circuit. This clock circuit provides a plurality of timing signals for the remaining units and circuits in digital arrangement 100. In addition, the clock circuit sends and receives a synchronization signal between a similar clock circuit 119 which provides timing signals for the units and circuits of the arrangement exchanging digital signals between the arrangement and network 101.

Supervisory information receiver 111 comprises a dual-port RAM memory 109, such as the WE 121A, for storing the supervisory information associated with each time slot and processor 120, such as the INTL 8051 microcomputer, for reporting the supervisory information on a periodic basis to central processor 115 via communication bus 157. Under stored program control, central processor 115, such as the Motorola 68000 microprocessor, scans the supervisory information associated with a call for certain supervisory information associated with a call for certain information such as call origination supervisory information indicating that calling customer line 150 is requesting service. Upon receiving call origination supervisory information, central processor 115 instructs switching network 114 to switch the call in a predetermined time slot from separator 110 to a selected time slot in another plurality of time slots to traffic information receivers such as 112 and 113. Central processor 115 selects a particular traffic information receiver such as receiver 112 to receive traffic information by sending instructions to time slot selector 121, such as the WE 267S, over communication bus 157. Traffic information receiver 112 comprises digital signal processor 122 such as the WE 310C, a data memory 123 such as the WE 2764 for storing a first and a second set of program instructions, and a tri-state latch 124 such as the WE LS245 for loading a first set of program instructions for receiving dual-tone multifrequency signals from customer line 150. In addition, central processor 115 sends instructions to a traffic information transmitter to send dial tone via unidirectional transmission path 155 and terminal 102 to calling customer line 150.

Digital arrangement 100 also comprises a plurality of traffic information transmitters such as 125 and 126, for transmitting digital dial tone in a certain time slot of a digital signal on unidirectional path 155 to terminal 102. Traffic information transmitter 126 comprises digital signal processor 127 for sending a digital dial tone signal to switching network 114, memory 128 for storing two sets of program instructions, and tri-state latch 186 for isolating the transmitter from bus 157 and loading instructions from the central processor into memory 128. One set of instructions is used by digital signal processor 127 to generate a dial tone signal to customer line 150. Digital signal processor 127 uses the second set of program instructions to generate and send, for example, a digital prompt signal to terminal 102 and calling line 150. Time slot selector 129 under the control of central processor 115 sends an enable signal to transmitter 126 to send the digital dial tone signal in the certain time slot of the digital signal to terminal 102 and calling customer line 150. Switching network 114 further includes a second time slot interchanger 189 for switching the digital dial tone signal in a particular time slot from transmitter 126 into the certain time slot in the signal to calling customer line 150.

Transmit formatter 130, such as the WE 257AL formatter, multiplexes the digital dial tone signal from switching network 114 and the supervisory information from supervisory information transmitter 131 and forwards the multiplexed digital signal to framer 116. Framer 116 converts the unipolar multiplexed digital signal to negative and positive unipolar signals for line interface unit 132 and inserts terminal frame and signal frame timing signals into the digital signal. Line interface unit 132, such as the WE 606HM, converts the positive and negative unipolar digital signals to a bipolar PCM signal for transmission on unidirectional path 155 to terminal 102 and calling customer line 150.

Upon receiving dial tone at calling customer line 150, the customer thereat enters the directory number of, for example, called line 152. The entered called line directory number is received in a selected time slot by traffic information receiver 112 and forwarded to central processor 115 via communication bus 157. Switching network 114 switches the called directory number from the predetermined time slot in the digital signal from terminal 102 to the selected time slot for traffic information receiver 112

Central processor 115 instructs traffic information transmitter 126 to send a prompt to the calling customer line to return the customer-entered identification number. The customer at credit card reader station 105 inserts his credit card into the reader or keys in the credit card number which is then sent over unidirectional path 154 to information signal receiver 112. Receiver 112 then forwards the customer provided credit card identification number to central processor 115.

After receiving the credit card number from the information receiver 112, central processor sends the credit card number to data base 103 via universal asynchronous receiver transmitter 133, data modem 134, and data base communication line 158. Data base 103 verifies that the credit card number is valid and returns an authorization signal to the central processor via data base communication line 158.

Upon receiving the authorization signal to charge the customer-entered identification number for the call, central processor 115 sends the directory number of the called line to network 101 via traffic information transmitter 135. A plurality of traffic information transmitters such as 135 and 136 under the control of time slot selector 137 and central processor 115 send traffic information in indicated time slots of a digital signal communicated on unidirectional path 154 from the arrangement to network 101. Switching network 114 switches the traffic information in these time slots to appropriate time slots of the digital signal to network 101. Similar to transmitter 126, traffic information transmitter 135 comprises digital signal processor 138, memory 139, and tri-state latch 140 for sending the called line directory number in the predetermined time slot of the digital signal to switching network 114. Switching network 114 under the control of central processor 115 switches the directory number in the predetermined time slot to the designated time slot of the digital signal from the arrangement to network 101.

Switching network 114 under the control of central processor 115 comprises time slot interchanger 141 such as the WE 229DP, parallel-to-serial digital converter 142, serial to parallel digital signal converter 143, AND logic gates 144 and 145, and time slot selector 146 interconnected as shown in FIG. 2. Time slot interchanger 141 includes two random access buffer memories 147 and 148 for interchanging the information in the time slots of a digital signal from time slot separator 110 or a traffic information receiver into the time slots of a digital signal to network 101 via unidirectional path 154 or the time slots of a digital signal to traffic information receivers such as 112 and 113. In addition, time slot interchanger 141 includes a controller 149 under the control of central processor 115 for instructing memories 147 and 148 to interchange the time slots as indicated by central processor 115. In particular, the time slots of a digital signal from time slot separator 110 are converted from a parallel to a serial format by converter 142 and applied to logic AND gate 144. Time slot selector 146 under the control of central processor 115 gates an enable signal to logic AND gate 144 to forward the digital signal to time slot interchanger 141. Furthermore, the digital signals from traffic information transmitters 135 and 136 are applied to AND gate 145 and likewise applied to time slot interchanger 141 when time slot selector 146 gates an enable signal to logic AND gate 145 to forward the digital signals from these transmitters to the time slot interchanger. Normally, only one time slot of a digital signal from either separator 110 or one of the transmitters is applied to the time slot interchanger at a time. When, for instance, a digital signal is to be switched to unidirectional path 154, time slot interchanger memory 147 inserts the information in a predetermined time slot to a designated time slot of the digital signal to network 101. Well-known idle code is sent to the traffic information receivers from interchanger memory 148. When the information from an incoming digital signal is to be switched to the time slots of a digital signal to traffic information receivers 112 and 113, interchanger memory 128 inserts this information in a selected time slot to the receivers. Similarly, well-known idle code is sent in the designated time slot from interchanger memory 147 to network 101. The digital signal from switching network 114 to network 101 is multiplexed with the supervisory information from supervisory information transmitter 170 by transmit formatter 171 and transmitted to network 101 via framer 172 and line interface circuit 173 as previously described. Thus, the directory number of the called line is communicated to network 101 by traffic information transmitter 135 and switching network 114 in a digital signal on a unidirectional path 154 from the arrangement to network 101.

Prior to sending the directory number of the called line, supervisory information transmitter 170 under the control of central processor 115 sends supervisory information to network 101 to seize the designated time slot of the digital signal on digital communication line 153 for the call between the arrangement and the network in a well-known manner. Transmitter 170 comprises a dual port random access memory 174, such as the WE 128, and microprocessor 175, such as the 8051, for sending the supervisory information received from the central processor via tri-state latch 176. Supervisory information acknowledging seizure of the designated time slot for the call between the arrangement and network is received by supervisory information receiver 177 via receive converter 178, framer circuit 172, and time slot separator 179 in a manner previously described.

Network 101 processes the directory number of the called line and connects the call in the designated time slot of the digital signal to the network to called destination line 152. When the customer at the called line answers, the network returns well-known answer supervision to central processor 115 of digital arrangement 100. The central processor makes a record charging the call to the customer-entered identification number by recording the time that the origination and answer supervisory signals are received.

The central processor instructs switching network 114 to switch the call in the predetermined time slot of the digital signal from terminal 102 to the designated time slot of the digital signal to network 101 to complete a one-way communication path from the calling to the called line. Similarly, central processor instructs switching network 114 to switch the call in the particular predetermined time slot of the digital signal from network 101 to the certain time slot in the digital signal to terminal 102 to complete the second one-way communication path from the called to the calling line.

With two one-way communication paths established between the calling and called lines, line supervisory information receivers 111 and 177 monitor the supervisory information of the call received from respective the calling and called lines for disconnect supervisory information. After receiving disconnect supervisory information, central processor 115 completes the charge record for the call by entering the time that the disconnect supervisory information was received for the call. The call between the calling and the called lines is disconnected by central processor 115 receiving and forwarding supervisory information between digital terminal 102 and network 101 via supervisory information receivers 111 and 177 and supervisory information transmitters 131 and 170. Central processor 115 controls supervisory information transmitter 131 via communication bus 157 and tri-state latch 180.

Periodically, central processor 115 sends the call charge records to billing system 104 via well-known universal asynchronous receiver transmitter 181, data modem 182, and billing system line 159.

Digital arrangement 100 also includes a plurality of traffic information receivers such as 183 and 184 under the control of time slot selector 185 for receiving traffic information from network 101. This traffic information may be used to communicate information between network 101 and another network such as a local exchange when inserted between a plurality of customer lines and digital terminal 102. Thus, digital arrangement 100 may be used for different signaling protocols such as multifrequency compelled signaling for providing a host of well-known special services.

It is to be understood that the above-described digital arrangement is merely an illustrative embodiment of the principles of this invention and that numerous other arrangements may be devised by those skilled in the art without departing from the spirit and scope of the invention. In particular, one skilled in the art may easily develop a number of other special services such as advanced INWATS for exchanging routing information between a calling and a called line. In addition, other special services such as providing customer prompts instructing the customer to dial different routing digits for advancing the call to completion.

What is claimed is:

1. An arrangement for charging a customer-entered identification number for a call originated from a calling line and extendable to a called destination via a communications channel, said call including supervisory and traffic information, comprising:

means for separating said supervisory information from said call on said channel;

traffic receiver means for receiving said traffic information including said customer-entered identification number for said call on said channel;

switching means for switching said call on said channel to said traffic receiver means;

processor means for controlling said switching means and responsive to predetermined of said supervisory information from said separating means and to said customer-entered identification number from said traffic receiver means for making a record charging said customer-entered identification number for said call; and means for communicating said customer-entered identification number to a data base, independent of said arrangement, for returning authorization to charge said number for said call.

2. The arrangement of claim 1 further comprising superpvisory receiver means for forwarding said supervisory information from said separating means to said processor means.

3. The arrangement of claim 1 further comprising terminal means for interfacing a plurality of calling lines to said communication channel.

4. An arrangement for charging a call to a customer-entered identification number, comprising:
a communication channel extending call communications from a calling line to a telecommunications network for extending said call communications to a called destination;
means for sending said number in said call communications on said channel to a data base independent of said network;
switching means for switching said call communications on said channel to said sending means; and
processor means for controlling said means for sending and said means for switching and responsive to said number and authorization from said data base for making a record charging said number for said call.

5. An arrangement for charging a customer-entered identification number for a call from a calling line to a called line via a digitial communications line and a telecommunications network, said digital line for communicating a first digital signal having a first plurality of time slots and including said call from said calling line to said arrangement in a predetermined one of said first time slots and a second digital signal having a second plurality of time slots and including said call from said arrangement to said network in a designated one of said second time slots, said call including supervisory and traffic information, comprising:
means for separating said supervisory information of said call form said first digit signal;
supervisory receiver means for receiving said supervisory information from said separating means;
switching means for switching said call from said predetermined time slot to a selected one of a third plurality of time slots;
traffic receiver means for receiving said traffic information including said customer-entered identification number of said call in said selected time slot; and
processor means for controlling said switching means and responsive to predetermined of said supervisory information from said supervisory receiver means and said customer-entered identification number from said traffic receiver means for making a record charging said customer-entered identification number for said call.

6. The invention of claim 5 wherein said traffic information includes a directory number of said called line and wherein said arrangement further comprises traffic transmitter means for sending a prompt to said calling customer line to send said customer-entered identification number to said arrangement.

7. The invention of claim 6 wherein said traffic transmitter means comprises signal processor means under the control of said processor means and responsive to a first set of program instructions for generating said prompt.

8. The invention of claim 7 wherein said signal processor means is responsive to a second set of program instructions for sending dial tone to said calling line and wherein said traffic transmitter means further comprises memory means for storing said first and second sets of program instructions.

9. The invention of claim 6 wherein said prompt from said traffic transmitter means to said calling customer is included in a particular one of a fourth plurality of time slots and wherein said switching means further comprises a time slot interchanger for inserting said prompt in said particular time slot into a certain one of a fifth plurality of time slots of a third digital signal from said arrangement to said calling customer line.

10. The invention of claim 5, further comprising means for receiving from a data base line authorization to charge said customer-entered identification number for said call in response to sending said customer-entered identification number from said processor means to said data base line.

11. The invention of claim 10 wherein said traffic information includes a directory number of said called line and wherein said arrangement further comprises traffic transmitter means for sending said called line directory number from said arrangement to said network when said processor means receives said authorization.

12. The invention of claim 11 where said traffic transmitter means comprises signal processor means under the control of said processor means and responsive to program instructions for sending said called line directory number from said arrangement to said network and memory means, for storing said program instructions.

13. The invention of claim 11 further comprising means for selecting said predetermined time slot for said traffic transmitter to send said called line directory number to said switching means and wherein said switching means further comprises a time slot interchanger for inserting said called line directory number in said predetermined time slot of said first digit signal into said designated time slot of said second digital signal from said arrangement to said network.

14. The invention of claim 5 wherein said traffic information includes a directory number of said called line and wherein said traffic receiver means comprises signal processor means under the control of said processor means and responsive to a first set of program instructions for receiving said called line directory number and responsive to a second set of program instructions for receiving said customer-entered identification number.

15. The invention of claim 14 wherein said traffic receiver means further comprises memory means for storing said first and second sets of program instructions.

16. The invention of claim 5 further comprising means for sending to a system line said billing record charging said customer-entered identification number for said call.

17. The invention of claim 5 wherein said switching means further comprises a first time slot interchanger under the control of said processor means for inserting said call in said predetermined time slot of said first digital signal from said calling line into said designated time slot of said second digital signal to said network.

18. The invention of claim 17 wherein switching means further comprises a second time slot interchanger for inserting said call in a particular one of a fourth plurality of time slots of a digital signal from said network to said arrangement into a certain one of a fifth plurality of time slots of a digital signal from said arrangement to said calling line.

19. The invention of claim 5 wherein said supervisory receiver means comprises memory means for storing said supervisory information from said separating means.

20. The invention of claim 19 wherein said supervisory receiver means further comprising second processor means for reporting said supervisory information in said memory means to said processor means.

21. The invention of claim 5 further comprising supervisory transmitter means under the control of said processor means for sending said supervisory information to said network.

22. The invention of claim 21 further comprising means for including said supervisory information from said supervisory transmitter means in said second digital signal to said network.

23. The invention of claim 5 further comprising supervisory receiver means for reporting said supervisory information from said network to said processor means.

24. The invention of claim 23 further comprising supervisory transmitter means under the control of said processor means for sending said supervisory information from said network to said calling line.

* * * * *

UNITED STATES PATENT AND TRADEMARK OFFICE
CERTIFICATE OF CORRECTION

PATENT NO. : 4,791,640

DATED : December 13, 1988

INVENTOR(S) : William C. Sand

It is certified that error appears in the above-identified patent and that said Letters Patent is hereby corrected as shown below:

Column 9, line 33, "ca11" should read --call--.

Column 9, line 33, delete "form" and insert --from--.

Column 10, line 20, delete "where" and insert --wherein--.

Column 10, line 25, after "means", delete the comma.

Column 10, line 58, after "wherein", insert --said--.

Signed and Sealed this

Twelfth Day of December, 1989

Attest:

JEFFREY M. SAMUELS

*Attesting Officer*　　*Acting Commissioner of Patents and Trademarks*